United States Patent [19]

Bradshaw

[11] 4,327,441
[45] Apr. 27, 1982

[54] METHOD AND APPARATUS FOR SYNCHRONIZING AND CALIBRATING A RECEIVER TO A PULSE WIDTH MODULATION TRANSMITTER

[75] Inventor: David H. Bradshaw, Dallas, Tex.

[73] Assignee: Texas Instruments Incorporated, Dallas, Tex.

[21] Appl. No.: 136,030

[22] Filed: Mar. 31, 1980

[51] Int. Cl.³ .............................................. H04L 7/10
[52] U.S. Cl. ..................................... 375/113; 375/22; 375/94; 340/696; 340/825.63
[58] Field of Search ...................... 370/9, 100; 371/42, 371/46, 47; 307/234, 265; 340/167 A, 167 R, 694–696; 329/104, 106; 375/95, 96, 111, 116, 22, 113, 10; 318/599; 328/111, 112

[56] References Cited

U.S. PATENT DOCUMENTS

| | | | |
|---|---|---|---|
| 3,449,720 | 6/1969 | Marino | 340/167 R |
| 3,852,713 | 12/1974 | Roberts | 340/167 A |
| 3,906,379 | 9/1975 | Tuhro | 307/234 |
| 4,005,818 | 2/1977 | Krause | 375/111 |
| 4,065,639 | 12/1977 | Suzuki | 375/116 |

Primary Examiner—Benedict V. Safourek
Assistant Examiner—Stephen Chin
Attorney, Agent, or Firm—Gary C. Honeycutt; Rich Donaldson; Mel Sharp

[57] ABSTRACT

An improvement in a communication system is disclosed having a transmitter which transmits a pulse width modulated control signal having a synchronizing pulse, a reference pulse, and at least one control function pulse encoded therein. At least one receiver receives the transmitted control signal and detects the pulses encoded therein. In response to each detected pulse, a timing circuit in each receiver provides a timing pulse having a width related to a reference signal. A reference controller compares the width of the detected reference pulse to the width of the timing pulse and provides a reference calibration signal at a level automatically selected to reduce the compared pulse width difference. A function controller may be provided to compare the width of the detected control function pulse to the width of the timing pulse, and to perform a control function in response to a predetermined compared width difference therebetween.

12 Claims, 7 Drawing Figures

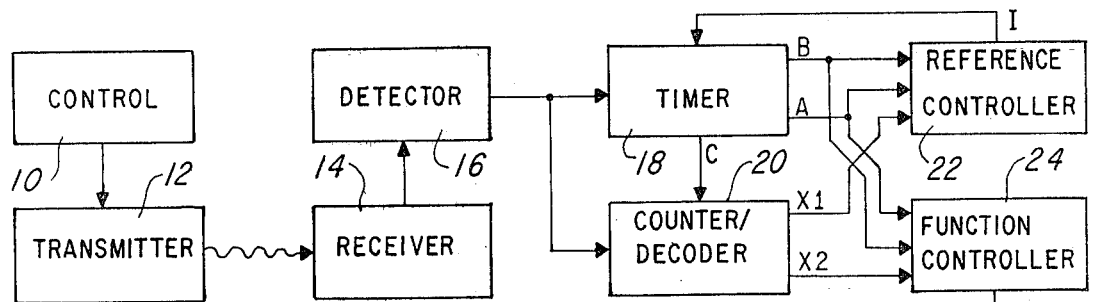
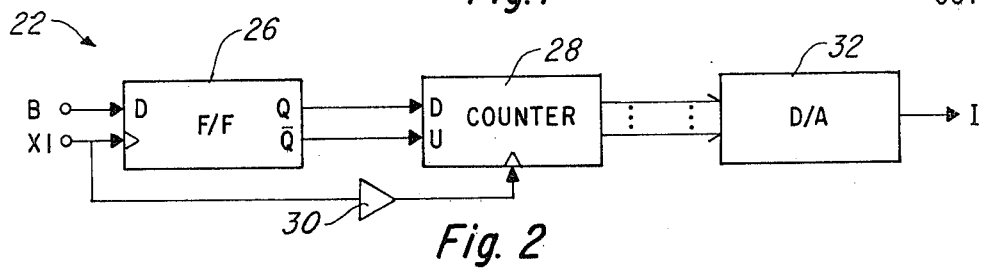
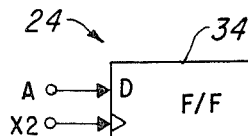
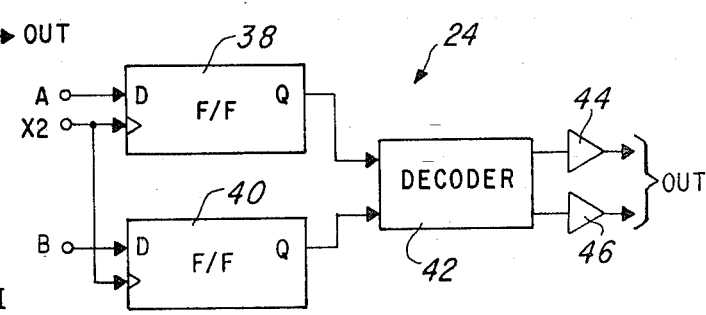
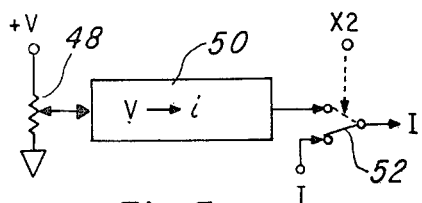
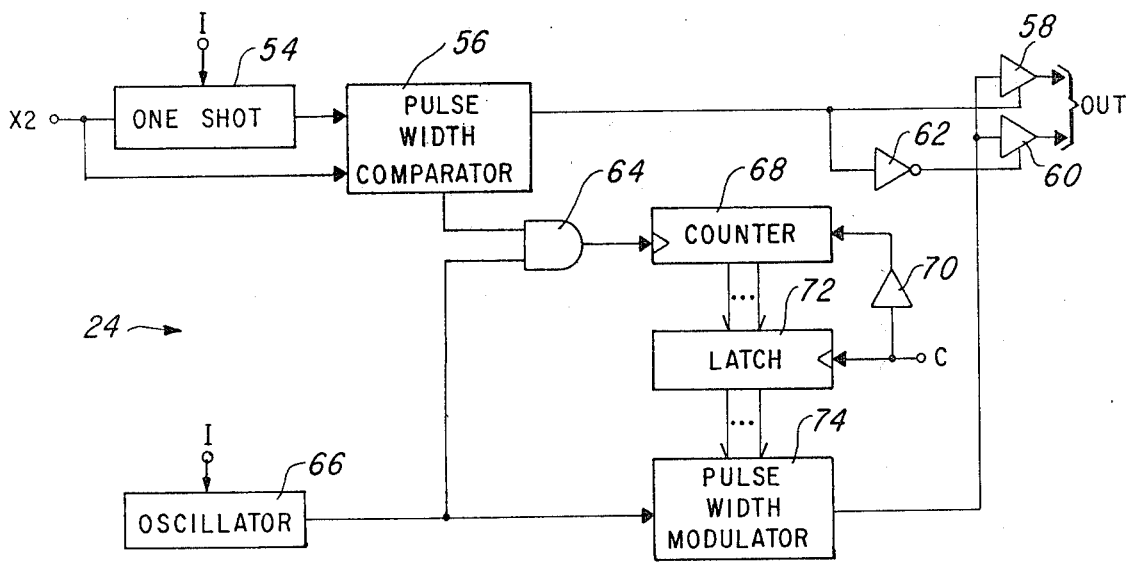

METHOD AND APPARATUS FOR SYNCHRONIZING AND CALIBRATING A RECEIVER TO A PULSE WIDTH MODULATION TRANSMITTER

BACKGROUND OF THE INVENTION

1. Field of the Invention

This invention relates generally to communication systems and, more particular, to a pulse width modulated communication system having a transmitter and at least one receiver synchronized and calibrated thereto.

2. Prior Art Statement

Various types of automatic control circuits have been developed in an effort to improve the performance of radio-frequency (RF) communication systems. For example, automatic sensitivity and gain control circuits are typically provided in frequency modulated communication systems. On the other hand, automatic frequency control circuits, such as phase lock loops, are typically provided in amplitude modulated communication systems. In contrast, pulse width modulated communication systems have generally required manual tuning to calibrate, i.e., align the pulse width discrimination circuits in, the receiver to the pulse generation circuits in the transmitter. In addition, such system generally require frequent manual readjustment in order to fully compensate for temperature and age induced drift.

SUMMARY OF THE INVENTION

The present invention provides a method and apparatus for the automatic pulse width calibration of the receiver of a pulse width modulation communication system to the transmitter thereof. In addition to being simple and straightforward in its operation, the present invention, as disclosed in the preferred embodiment set forth herein, facilitates the rapid calibration of the receiver to the transmitter so as to minimize any response error in the function controller which is responsive to the width of a transmitted control function pulse relative to a transmitted reference pulse.

To achieve these objects, the pulse width modulated communication system of the present invention includes a transmitter which transmits a pulse width modulated control signal having a synchronizing pulse, a reference pulse, and at least one control function pulse encoded therein. A receiver receives the transmitted control signal and detects the pulses encoded therein. A timing circuit provides, in response to each detected pulse, a timing pulse having a width related to a reference signal. A reference controller compares the width of the detected reference pulse to the width of the timing pulse and provides the reference, i.e., calibration signal at a level selected to reduce the compared width difference. A function controller compares the width of the detected control function pulse to the width of the timing pulse, and performs a control function in response to a predetermined compared width difference therebetween.

Other objects and advantages of the present invention will be evident from the following detailed description when read in conjunction with accompanying drawings which illustrate the preferred embodiment thereof.

BRIEF DESCRIPTION OF THE DRAWINGS

FIG. 1 is a schematic representation of a pulse width modulated communication system constructed in accordance with the preferred embodiment of the present invention.

FIG. 2 is a schematic representation of the reference controller portion of the communication system of FIG. 1.

FIG. 3 is a schematic representation of a single function controller suitable for use in the communication system of FIG. 1.

FIG. 4 is a schematic representation of a multiple function controller suitable for use in the communication system of FIG. 1.

FIG. 5 is a schematic representation of a feedback control circuit suitable for controlling the operation of the function controllers of FIGS. 3 or 4.

FIG. 6 is a schematic representation of a continuous function controller suitable for use in the communication system of FIG. 1.

DESCRIPTION OF THE PREFERRED EMBODIMENT

Figure 1A:
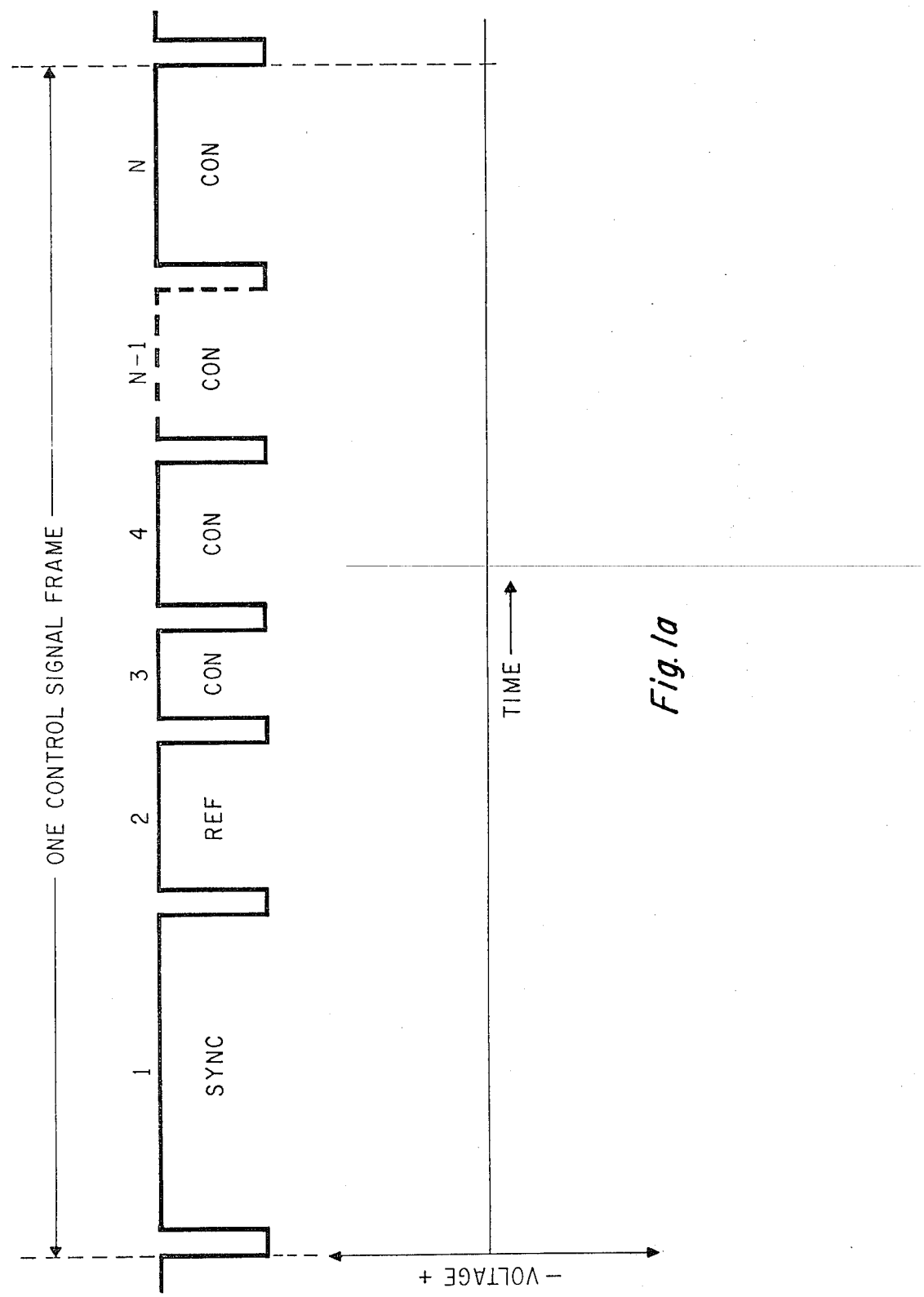
FIG. 1a is a waveform illustrative of a transmitted pulse width modulated control signal having a synchronizing pulse, a reference pulse, and any number of control function pulses encoded therein.

In the pulse width modulated communication system shown in FIG. 1, a control circuit 10 of conventional form provides a synchronizing pulse 1, a reference pulse 2, and any number of control function pulses 3 through N (as best illustrated in FIG. 1a, respectively) of predetermined pulse width relative to the reference pulse 2. A transmitter 12 receives the pulses, and transmits, in a well known manner, a pulse width modulated control signal (as best illustrated in FIG. 1a) having the synchronizing pulse 1, the reference pulse 2, and the control function pulses 3 through N sequentially encoded therein. A conventional RF receiver 14 receives the transmitted control signal of FIG. 1a and provides the received control signal to a detector 16. The detector 16 employs conventional techniques, such as envelope detection, to detect the encoded pulses in the received control signal, and to provide a detection pulse corresponding to each detected synchronizing, reference and control function pulse. In response to each detection pulse, a timer 18 provides a timing pulse B having a width which is related to a reference, i.e., calibration, signal I applied thereto. Preferably, the timer 18 simultaneously provides three timing pulses A, B and C, with the duration of timing pulse A being somewhat shorter than the duration of timing pulse B and the duration of timing pulse C being somewhat longer than the duration of timing pulse B, for reasons made more apparent below.

In response to the leading edge of each detection pulse, a counter/decoder 20 increments a pulse count, and provides, for the duration of the detection pulse, an output clock signal $X_1$ or $X_2$ depending upon the count, i.e., the numbered sequence, of the decoded pulse. For example, assuming an initial pulse count of zero, the counter/decoder 20 will increment the pulse count in response to the leading edge of the detection pulse corresponding to the detected synchronizing pulse 1, and will provide the clock signal $X_1$ for the duration of the detection reference pulse 2. Upon receiving sequentially thereafter the leading edge of the detection pulses corresponding to the detected control function pulses 3 through N, the counter/decoder 20 will again increment the pulse count, and will provide the clock signal $X_2$ for the duration of each detection pulse. Assuming that no other pulses are thereafter detected in the received control signal, the counter/decoder 20 will clear or reset the pulse count in response to the trailing edge of the timing pulse C, and will provide neither controller a clock signal. Thus, the pulse count is relative to the synchronizing pulse 1, the duration of the clock signal $X_1$ corresponds to the width of the detected reference pulse 2 and the duration of the clock signal $X_2$ sequentially corresponds to the width of each detected control function pulse 3 through N, respectively.

A reference controller 22 compares the width of the detected reference pulse as represented by the clock signal $X_1$ to the width of the timing pulse B. Depending upon the compared width difference, the reference controller 22 will provide the reference, i.e., calibration, signal I at a level automatically selected to reduce the compared width difference between the detected reference pulse 2 and the timing pulse B. Since the width of the timing pulse B is automatically determined by the level of the reference, i.e. calibration signal I, the width of the timing pulse B will thus automatically converge with the width of the detected reference pulse as represented by the clock signal $X_1$.

A function controller 24 compares the width of each detected control function pulse 3 through N as represented by the clock signl $X_2$ to the width of each corresponding timing pulse A. Depending upon the compared width difference, the function controller 24 will perform a control function such as providing a particular type of output signal. Since the width of the timing pulse A is related in a known manner to the width of the timing pulse B, the control circuit 10 can reliably initiate a control function by providing a function control pulse, e.g., 3, with a particular width relationship relative to the reference pulse 2, after the reference controller 22 is allowed sufficient opportunity to automatically calibrate, i.e., to automatically bring the timing pulse B into alignment with the width of the reference pulse 2. One technique for assuring the latter condition is to construct the control circuit 10 to repetitively provide only the reference pulse 2 for transmission and detection, a sufficient number of times to allow the reference controller 22 to automatically converge the timing pulse B, assuming an initial maximum difference. Thereafter, each time actuation of the function controller 24 is desired, the control circuit 10 may provide a reference pulse 2 to "fine tune" the timer 18, followed by any number of control function pulses 3 through N each of an appropriate width relative to the referece pulse 2.

In the preferred form of the reference controller 22 shown in FIG. 2, a D-type flip-flop 26 of conventional construction has the timing pulse B coupled to the D input thereof and the clock signal $X_1$ coupled to the clock input thereof. In response to the trailing edge of the clock signal $X_1$, the flip-flop 26 will register the logical condition of the timing pulse B, and provide complementary output signals Q and $\overline{Q}$. Thus, for example, if the timing pulse B is still present upon occurrence of the trailing edge of the clock signal $X_1$, the flip-flop 26 will provide a logical high signal on the Q output and a logical low symbol on the $\overline{Q}$ output. On the other hand, if the timing pulse B has terminated prior to the trailing edge of the clock signal $X_1$, the flip-flop 26 will provide a low signal on the Q output and a high signal on the $\overline{Q}$ output.

A counter 28 of the up/down configuration has the D or Down input thereof coupled to the Q output of the flip-flop 26, the U or Up input thereof coupled to the $\overline{Q}$ output of the flip-flop 26, and the clock input coupled to receive the clock signal X1 after the latter has been delayed by a buffer 30 sufficiently long to assure complete operation of the flip-flop 26. In response to the trailing edge of the delayed clock signal $X_1$, the counter 28 (not to be confused with the counter/decoder 20 of FIG. 1). will either decrement or increment a reference count maintained therein, depending upon the presence of a logical high on the D or U inputs, respectively. Thus, the counter 28 will count down so long as the width of the timing pulse B is longer than the width of the reference pulse 2 as represented by the clock signal $X_1$, and will count up so long as the width of the timing pulse B is less than the width of the reference pulse 2 as represented by the clock signal $X_1$. In either event, the digital value of the reference count maintained in the counter 28 is coupled to a digital-to-analog (D/A) converter 32 which utilizes conventional techniques to provide the reference, i.e., calibration signal I at an analog level corresponding to the digital count value applied thereto. Preferably, the reference, i.e., calibration, signal I, which may be either voltage or current related, is utilized in the timer 18, as best illustrated in FIG. 1, to control the charging rates or current sources of timing capacitors or the like. Alternatively, the digital representation of the count value can be coupled directly from the counter 28, in FIG. 2, to digital timing circuitry in the timer 18 of FIG. 1.

If the function to be controlled by the function controller 24, as best illustrated in FIG. 1, is of the binary type, such as a simple off/on function, a form such as that shown in FIG. 3 will generally be effective. In the illustrated form of FIG. 3, a conventional D-type flip-flop 34 has the timing pulse A coupled to the D input thereof and the clock signal $X_2$ coupled to the clock input thereof. If the timing pulse A is present upon occurrence of the trailing edge of clock signal $X_2$, the flip-flop 34 will provide a logical high signal on the Q output thereof, and a logical low signal otherwise. Thus, the Q output of the flip-flop 34 will be high or "on" if the width of the timing pulse A is longer than the width of the control function pulse as represented by the clock signal $X_2$, and low or "off" if the width of the timing pulse A is shorter than the width of the control pulse function pulse as represented by the clock signal $X_2$. If desired, a buffer 36 of conventional form may be provided to adapt the Q output of the flip-flop 34 to the voltage or current requirements of the functional circuitry being controlled thereby.

If the function to be controlled by the function, controller 24, as best illustrated in FIG. 1, is of the ternary type, such as a forward/off/reverse function, a form such as that shown in FIG. 4 will generally be effective. In the illustrated form of FIG. 4, a first conventional D-type flip-flop 38 has the timing pulse A coupled to the D input thereof and the clock signal $X_2$ coupled to the clock intput thereof. A second conventional D-type flip-flop 40 has the timing pulse B coupled to the D input thereof and the clock signal $X_2$ coupled to the clock input thereof. If both of the timing pulses A and B are simultaneously present upon occurence of the trailing edge of the clock signal $X_2$, each of the flip-flops 38 and 40 will provide a logical high signal on the Q outputs thereof. However, if the timing pulse A has terminated but the longer timing pulse B is still present upon occurence of the trailing edge of the clock signal $X_2$, only the second flip-flop 40 will provide a logical high signal on the Q output thereof. On the other hand, if both the timing pulses A and B have terminated prior to occurrence of the trailing edge of the clock signal $X_2$, each of the flip-flops 38 and 40 will provide a logical low signal on the Q outputs thereof. Thus, upon the decoding of the Q output signals of the flip-flops 38 and 40 by a conventional decoder 42, (a) an output signal will be provided via a buffer 44 if the width of the control function pulse as represented by the clock signal $X_2$ is shorter than the widths of both of the timing pulses A and B, (b) an output signal will be provided via a buffer 46 if the width of the control function pulse as represented by the clock signal $X_2$ is longer than the width of the timing pulse A but shorter than the width of the timing pulse B, or (c) no output signal will be provided if the width of the control function pulse as represented by the clock signal $X_2$ is longer than both of the timing pulses A and B. If desired, an additional level of control may be provided without modifying the timer 18, as best illustrated in FIG. 1, by including an additional D-type flip-flop (not shown) responsive to the timing pulse C as illustrated in FIG. 1, together with appropriate expansion of the decoder 42 and inclusion of an additional buffer, as best illustrated in FIG. 4.

In some circumstances, it may be desirable to enable the function controller 24, as best illustrated in FIG. 1, to terminate the control function upon the attainment of a predetermined physical condition. In such an event, a feedback circuit such as that shown in FIG. 5 may be effective to modify the operation of either the binary or ternary function controllers 24 of FIGS. 3 or 4, respectively. In the illustrated form of FIG. 5, a potentiometer 48 responsive to the position of a physical element being controlled by the output signal from the function controller 24, provides a feedback voltage to a conventional voltage to current converter 50. For the duration of the clock signal $X_2$, a switch 52, interposed generally in the signal path from the reference controller 22 to the timer 18, couples a feedback current corresponding to the input reference voltage of the timer 18. Thus, the reference, i.e., calibration signal I applied to the timer 18 is proportional to the relative position of the controlled element as sensed by the potentiometer 48. If the width of the control function pulse has been appropriately selected by the control circuit 10 to be proportional to the feedback voltage provided by the potentiometer 48, then the width of the control function pulse as represented by the clock signal $X_2$ will slightly exceed the width of the timing pulse B when the controlled element has attained the desired position, and no outputs will be provided by the decoder 42. For example, a function controller 24 such as that shown in FIG. 4 may be utilized to control the movement of a steering mechanism in a first direction in response to an output signal via the buffer 44 and in the opposite direction in response to an output signal via the buffer 46. If the potentiometer 48 is responsive to the instantaneous position of the steering mechanism, the voltage to current converter 50 and the switch 52 will cooperate with the timer 18 to adjust the pulse width of the timing pulse A and B so that both actuating mechanisms are quiescent when the steering mechanism has attained the desired orientation.

If the function to be controlled by the function controller 24, as best illustrated in FIG. 1, is of a continuous binary type, such as forward speed/reverse speed, a form such as that shown in FIG. 6 will generally be effective. In the illustrated form of FIG. 6, a conventional one shot 54 provides an output pulse having a width proportional to the reference signal I, in response to the leading edge of the clock signal $X_2$. A pulse width comparator 56 utilizes conventional techniques to, compare the width of the clock signal $X_2$ with the output signal from the one shot 54, and to apply a direction control signal indicative of the compared difference to a pair of buffers 58 and 60, the latter via an inverter 62. Thus, for example, the buffer 58 will be enabled by the direction control signal if the pulse width comparator 56 determines that the width of the control function pulse as represented by the clock signal $X_2$ is shorter than the output signal provided by the one shot 54. On the other hand, the buffer 60 will be enabled by the direction control signal provided by the pulse width comparator 56 via the inverter 62 if the width of the control function pulse as represented by the clock signal $X_2$ is longer than the output signal provided by the one shot 54.

The pulse width comparator 56 also enables a gate 64 to couple the output pulses provided by an oscillator 66 to the clock input of a counter 68 for the duration of the actual compared width difference. Assuming that the counter 68 has been reset in response to the trailing edge of the previous timing pulse C, as delayed somewhat by a buffer 70, the count value contained in the counter 68 upon termination of the longer of the clock signal $X_2$ and the output signal provided by the one shot 54, will be a digital representation of the compared width difference in terms of the output pulses provided by the oscillator 66. If the oscillation rate of the oscillator 66 is related to the reference signal I, then the terminal count value maintained by the counter 68 will be predictably related to the difference in the width of the previous control function and reference pulses. This terminal count value, after storage in a conventional latch 72 upon occurance of the trailing edge of the timing pulse C, may then be utilized by a pulse width modulator 74 of known form to determine the relative width of output pulses to be applied to the buffers 58 and 60 at a frequency related to the oscillation rate of the oscillator 66. For example, if the width of the control function pulse differs significantly from that of the output pulse of the one shot 54, relatively long pulses will be applied at a particular frequency to the buffers 58 and 60. In contrast, very short duration pulses will be applied at the same frequency to the buffers 58 and 60 if the width of the control function pulse differs only slightly from that of the output pulse of the one shot 54. Thus, both duty cycle and direction can be independently selected by varying the width of the control function pulse in a predetermined manner relative to the width of the reference pulse.

Although the present invention has in some aspects described herein in the context of a preferred embodiment capable of performing only a single control function in response to receiving a single control function, e.g., 3, pulse of predetermined width relative to a reference pulse 2, it will be appreciated by those skilled in the art that more than one of the function controllers 24 may be provided if the counter/decoder 20 is expanded in a conventional manner to provide additional clock signals in response to receiving the control function pulses 4 through N assigned to the additional function controllers 24. In addition, function controllers 24 other than those shown by way of example in FIGS. 3, 4 and 6 may be employed in appropriate circumstances to achieve different control functions. Other changes may be made in the construction and arrangement of the parts of elements of the preferred embodiment as disclosed herein without departing from the spirit and scope of the present invention as defined in the various claims appended hereto.

Obviously, many modifications and variations of the present invention are possible in light of the above teachings. It is, therefore, to be understood that within the scope of the appended claims, the invention may be practiced otherwise than as specifically described.

What is claimed is:

1. A communication system comprising, in combination:
   (A) transmitter means for transmitting a pulse width modulated control signal having a synchronizing pulse, a reference pulse, and at least one control function pulse encoded therein; and
   (B) receiver means for receiving said transmitted control signal, detecting said pulses encoded therein, and for performing a control function determined by the width of said control function pulse relative to the width of said reference pulse, said receiver means comprising:
      (a) receiver means for receiving the transmitted control signal;
      (b) detection means for detecting said synchronizing, reference and control function pulses in said received control signal:
      (c) timing means for providing, in response to each said detected pulse, a timing pulse having a width related to a reference signal;
      (d) reference controller means for comparing the width of the said detected reference pulse to the width of the said timing pulse, and for providing the said reference signal at a level automatically selected to calibrate the width of said timing pulse to the width of said detected reference pulse; and
      (e) function controller means for comparing the width of the said detected control function pulse to the width of the said calibrated timing pulse, and for performing the said control function in response to a predetermined compared width difference.

2. In a communication system including:
   (A) transmitter means for transmitting a pulse width modulated control signal having a reference pulse encoded therein;
   (B) a receiver comprising:
      (a) means for receiving said transmitted control signal;
      (b) means for detecting said reference pulse encoded in said received control signal;
      (c) timing means for providing, in response to each detected pulse, a timing pulse having a width related to a reference signal; and
      (d) reference controller means for comparing the width of said detected reference pulse to the width of said timing pulse, and for providing said reference signal at a level automatically selected to calibrate the width of said timing pulse to the width of said detected reference pulse.

3. A communication system as set forth in claim 2 wherein said pulse width modulated control signal also has a control function pulse encoded therein which is detected in said receiver, said receiver further comprising, in combination: function controller means for comparing the width of said detected control function pulse to the width of said calibrated timing pulse, and for performing a control function in response to a predetermined compared width difference.

4. A receiver comprising:
   (a) means for receiving a transmitted pulse width modulated control signal having a reference pulse encoded therein;
   (b) detection means for detecting said reference pulse encoded in said received control signal;
   (c) timing means for providing, in response to each said detected pulse, a timing pulse having a width related to a reference signal; and
   (d) reference controller means for comparing the width of said detected reference pulse to the width of said timing pulse, and for providing said reference signal at a level automatically selected to calibrate the width of said timing pulse to the width of said detected reference pulse.

5. A receiver as set forth in claim 4 where in said received transmitted control signal also has a control function pulse encoded therein which is detected by said detection means, said receiver further comprising; function controller means for comparing the width of said detected control function pulse to the width of said timing pulse, and for performing a control function in response to a predetermined compared width difference.

6. In a pulse width modulated communication system, a method for automatically calibrating and synchronizing a receiver to a transmitter, comprising the steps of:
   (a) transmitting a pulse width modulated control signal having a reference pulse encoded therein;
   (b) receiving said transmitted control signal;
   (c) detecting said reference pulse s encoded in said received control signal;
   (d) providing, in response to said detected pulse, a timing pulse having a width related to a reference signal;
   (e) comparing the width of said detected reference pulse to the width of said timing pulse; and
   (f) providing said reference signal at a level automatically selected to calibrate the width of said timing pulse to the width of said detected reference pulse.

7. A method as set forth in claim 6 wherein the transmitting step further comprises the steps of: transmitting said pulse width modulated control signal with a reference pulse and at least one control function pulse encoded therein.

8. A method for synchronizing and calibrating a receiver to a transmitted pulse width modulated control signal having a reference pulse encoded therein, said method comprising the steps of:
   receiving said transmitted control signal;
   detecting said reference pulse encoded in said received control signal;
   providing, in response to each detected pulse, a timing pulse having a width related to a reference signal;
   comparing the width of said detected reference pulse to the width of said timing pulse; and
   providing said reference signal at a level automatically selected to reduce the compared width difference.

9. A method as set forth in claim 8 wherein said transmitted control signal has a control function pulse and a synchronizing pulse encoded therein, and wherein the detecting step further comprises the steps of:

detecting said synchronizing and control function pulses in said received control signal.

10. A method as set forth in claim 9 further comprising comparing the width of said detected control function pulse to the width of said calibrated timing pulse; and performing a control function in response to a predetermined compared width difference between said detected control function and calibrated timing pulses.

11. A method as set forth in claim 7 wherein said detecting step further comprises the steps of:

detecting said synchronizing and control function pulses encoded in said received control signal.

12. A method as set forth in claim 11 further comprising the steps of:

comparing the width of said detected control function pulse and the width of said timing pulse; and performing a control function in response to a predetermined compared width difference between said detected control function and calibrated timing pulses.

* * * * *

UNITED STATES PATENT AND TRADEMARK OFFICE
CERTIFICATE OF CORRECTION

PATENT NO. : 4,327,441

DATED : April 27, 1982

INVENTOR(S) : David H. Bradshaw

It is certified that error appears in the above–identified patent and that said Letters Patent are hereby corrected as shown below:

Column 1, line 26, the word "system" should read --systems--; line 54, after the word "calibration" insert --,--. Column 3, line 21, after the word "calibration" insert --,--; line 34, the phrase "function control" should read --control function--. Column 4, line 3, the phrase "clock signal X1" should read --clock signal $X_1$--; line 8, cancel ".", second occurrence; line 20, after the word "calibration" insert --,--; line 46, cancel the word "pulse", first occurrence; line 51, cancel ",". Column 5, line 40, the word "of" should read --to--; line 60, the phrase "timing pulse" should read --timing pulses--. Column 6, line 54, after "in some aspects", insert --been--; lines 57 and 58, the phrase reading "control function, e.g., 3, pulse of" should read --control function pulse, e.g., 3, of --. Column 7, line 2, the word "of", first occurrence, should be --or--. Claim 10, line 6, after "ing", insert --the steps of:--.

Signed and Sealed this

Twenty-fourth Day of August 1982

[SEAL]

Attest:

Attesting Officer

GERALD J. MOSSINGHOFF

Commissioner of Patents and Trademarks